United States Patent
Jacobs (10) Patent No.: US 7,926,081 B2
(45) Date of Patent: Apr. 12, 2011

(54) METHOD AND SYSTEM FOR FORMING A COUNTDOWN CLOCK CHANNEL OUTPUT

(75) Inventor: Mitch C. Jacobs, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 507 days.

(21) Appl. No.: 11/852,963

(22) Filed: Sep. 10, 2007

(65) Prior Publication Data

US 2009/0070837 A1 Mar. 12, 2009

(51) Int. Cl.
*H04N 7/173* (2006.01)
(52) U.S. Cl. .............. 725/104; 725/34; 725/35; 725/45; 705/14; 705/69
(58) Field of Classification Search .................. 725/104, 725/34, 45, 35
See application file for complete search history.

(56) References Cited

U.S. PATENT DOCUMENTS

2002/0194592 A1* 12/2002 Tsuchida et al. ................ 725/32
2007/0107012 A1* 5/2007 Rachamadugu ................ 725/34

* cited by examiner

*Primary Examiner* — Joseph P Hirl
*Assistant Examiner* — Jivka Rabovianski (57) ABSTRACT

A system and method includes an automation system and a scheduling system generating a schedule having a countdown time for a countdown clock assembly and communicating the schedule to an automation system. The system also includes a content repository storing promotional content and a clock background in the content repository. The automation system retrieves the promotional content and the clock background from the content repository, stores the promotional content and the clock background, forms a countdown clock assembly from the promotional content and the clock background and inserts the countdown clock assembly into a channel signal.

25 Claims, 8 Drawing Sheets

METHOD AND SYSTEM FOR FORMING A COUNTDOWN CLOCK CHANNEL OUTPUT

TECHNICAL FIELD

The present disclosure relates generally to television broadcasting, and more particularly to a method and apparatus for generating a countdown clock in a time space between two programs.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

Pay-per-view channel broadcasts often begin at regular time such as at the top and bottom of an hour. The programming typically has irregular ending times. Therefore filler material is often placed between the ending of one program and the beginning of another. The filler programming may be promotional material or commercials. A countdown clock may also be displayed to communicate the time left until the next program begins.

SUMMARY

The present disclosure provides a means for conveniently forming a countdown clock channel display.

In one aspect of the disclosure, a method includes generating a schedule having a countdown time for a countdown clock assembly, communicating the schedule to an automation system, storing promotional content in a content repository, storing a clock background in the content repository, retrieving the promotional content and the clock background from the content repository, forming a countdown clock assembly from the promotional content and the clock background and inserting the countdown clock assembly into a channel signal.

In a further aspect of the disclosure, a method includes generating a schedule having a countdown clock time, a promotional content identification and a background identification for a countdown clock assembly, communicating the schedule to an automation system, storing promotional content in a content repository, storing a clock background in the content repository, retrieving the promotional material and the clock background from the content repository based on the promotional content identification and the background identification from the schedule, storing the promotional material and the clock background in the automation system prior to the countdown clock time, forming a countdown clock assembly from the promotional material and the clock background and generating a channel signal from the countdown clock assembly.

In yet another aspect of the disclosure, a system includes an automation system and a scheduling system generating a schedule having a countdown time for a countdown clock assembly and communicating the schedule to an automation system. The system also includes a content repository storing promotional content and a clock background in the content repository. The automation system retrieves the promotional content and the clock background from the content repository, stores the promotional content and the clock background, forms a countdown clock assembly from the promotional content and the clock background and inserts the countdown clock assembly into a channel signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a schematic view of a first embodiment of monitoring a channel signal.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite transmission and data transmission and reception for home or business uses. The system may also be used in a cable system or wireless terrestrial communication system for generating an output signal.

Figure 1:
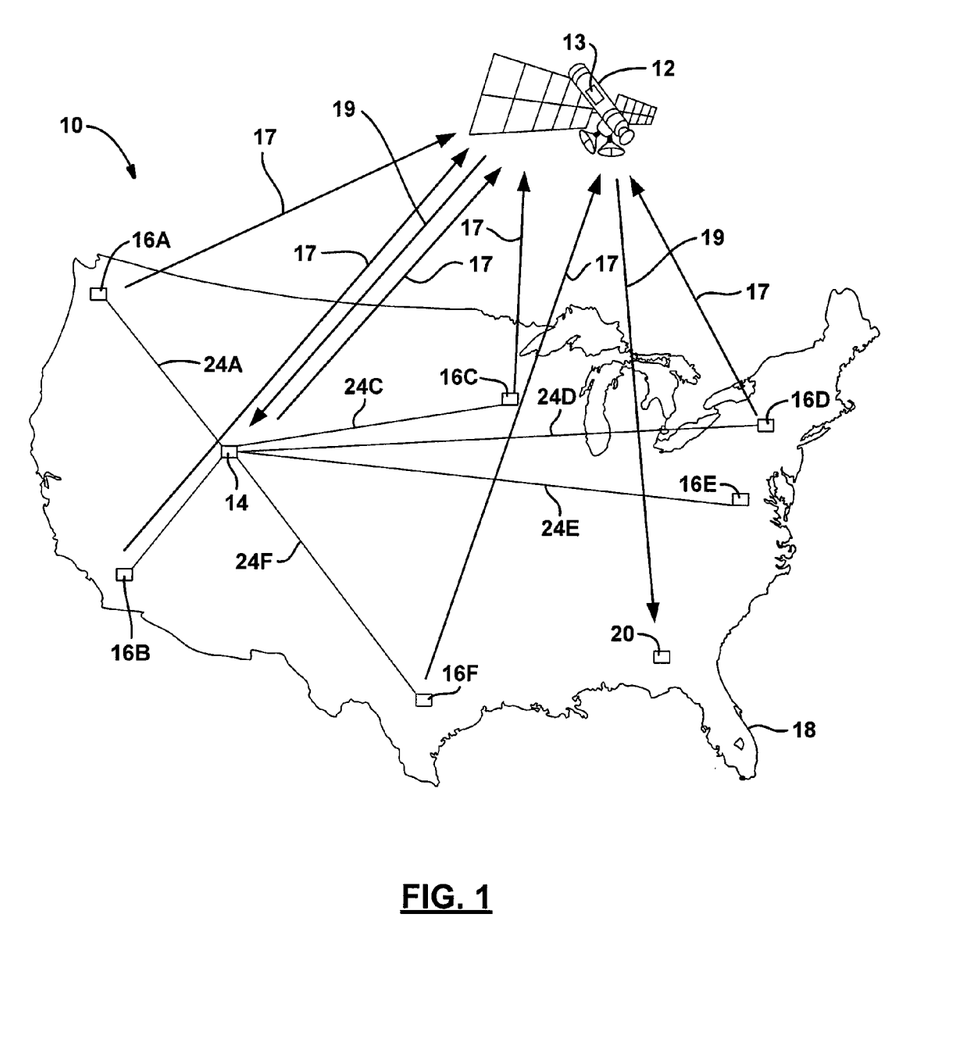
FIG. 1 is an overall system view of a satellite communication system in the continental United States.

Referring now to FIG. 1, a communication system 10 includes a satellite 12 that includes at least one transponder 13. Typically, multiple transponders are in a satellite. The communication system 10 includes a central facility 14 and a plurality of regional facilities 16A, 16B, 16C, 16D, 16E and 16F. Although only one satellite is shown, more than one is possible. The regional facilities 16A-16F may be located at various locations throughout a landmass 18 such as the continental United States, including more or less than those illustrated. The regional facilities 16A-16F uplink various uplink signals 17 to satellite 12. The satellites downlink downlink signals 19 to various users 20 that may be located in different areas of the landmass 18. The users 20 may be mobile or fixed users. The uplink signals 17 may be digital signals such as digital television signals or digital data signals. The digital television signals may be high definition television signals. Uplinking may be performed at various frequencies including Ka band. The present disclosure, however, is not limited to Ka band. However, Ka band is a suitable frequency example used throughout this disclosure. The central facility 14 may also receive downlink signals 19 corresponding to the uplink signals 17 from the various regional facilities and from itself for monitoring purposes. The central facility 14 may monitor the quality of all the signals broadcast from the system 10.

The central facility 14 may also be coupled to the regional facilities through a network such as a computer network having associated communication lines 24A-24F. Each communication line 24A-F is associated with a respective regional site 16. Communication lines 24A-24F are terrestrial-based lines. As will be further described below, all of the functions performed at the regional facilities may be controlled centrally at the central facility 14 as long as the associated communication line 24A-F is not interrupted. When a communication line 24A-F is interrupted, each regional site 16A-F may operate autonomously so that uplink signals may continually be provided to the satellite 12. Each of the regional and central facilities includes a transmitting and receiving antenna which is not shown for simplicity in FIG. 1.

Figure 2:
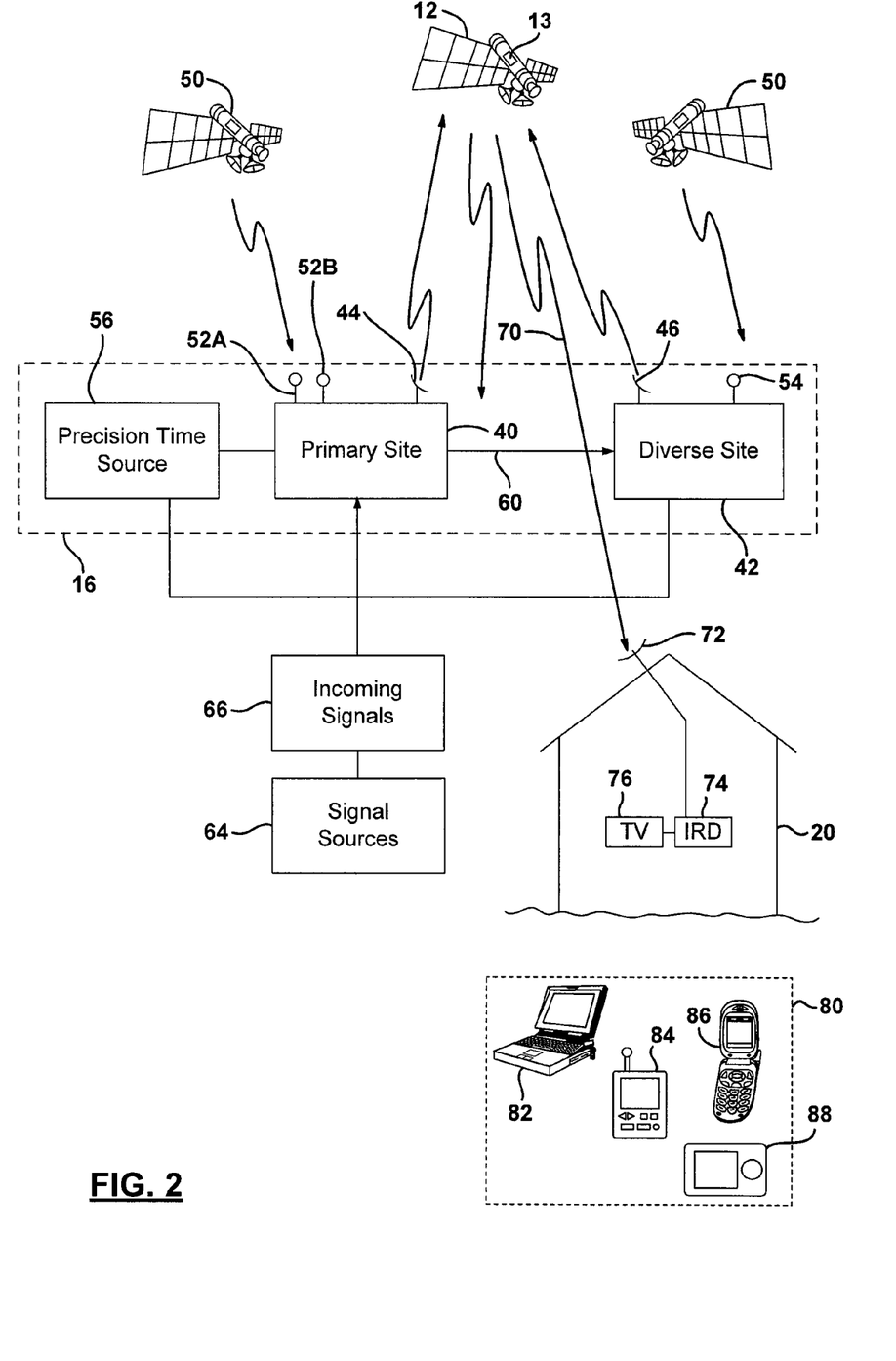
FIG. 2 is a system view at the regional level of a satellite system.

Referring now to FIG. 2, the regional facilities 16A-16F of FIG. 1 are illustrated collectively as reference numeral 16. The regional facilities 16 may actually comprise two facilities that include a primary site 40 and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over Internet protocol (IP).

Various signal sources 64 such as an optical fiber line, copper line or satellites may provide incoming signals 66 from the primary site 40 to the diverse site 42. Incoming signal 66, as mentioned above, may be television signals. The television signals may be high-definition signals. The incoming signals 66 such as the television signal may be routed from the primary site 40 through the communication line 60 to the diverse site 42 in the event of a switchover whether the switchover is manual or a weather-related automatic switchover. A manual switchover, for example, may be used during a maintenance condition.

In a terrestrial system, the satellites may be eliminated or replaced by transmission towers that use terrestrial antennas in place of antennas 46. In a cable system, the antennas 46 may be replaced with optical fibers or copper wires.

Users 20 receive downlink signals 70 corresponding to the television signals. Users 20 may include home-based systems or business-based systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder may be incorporated into or may be referred to as a set top box.

The user 20 may also be a mobile user. The user 20 may therefore be implemented in a mobile device or portable device. The portable device 80 may include but are not limited to various types of devices such as a laptop computer 82, a personal digital assistant 84, a cellular telephone 86 or a portable media player 88.

Figure 3A:
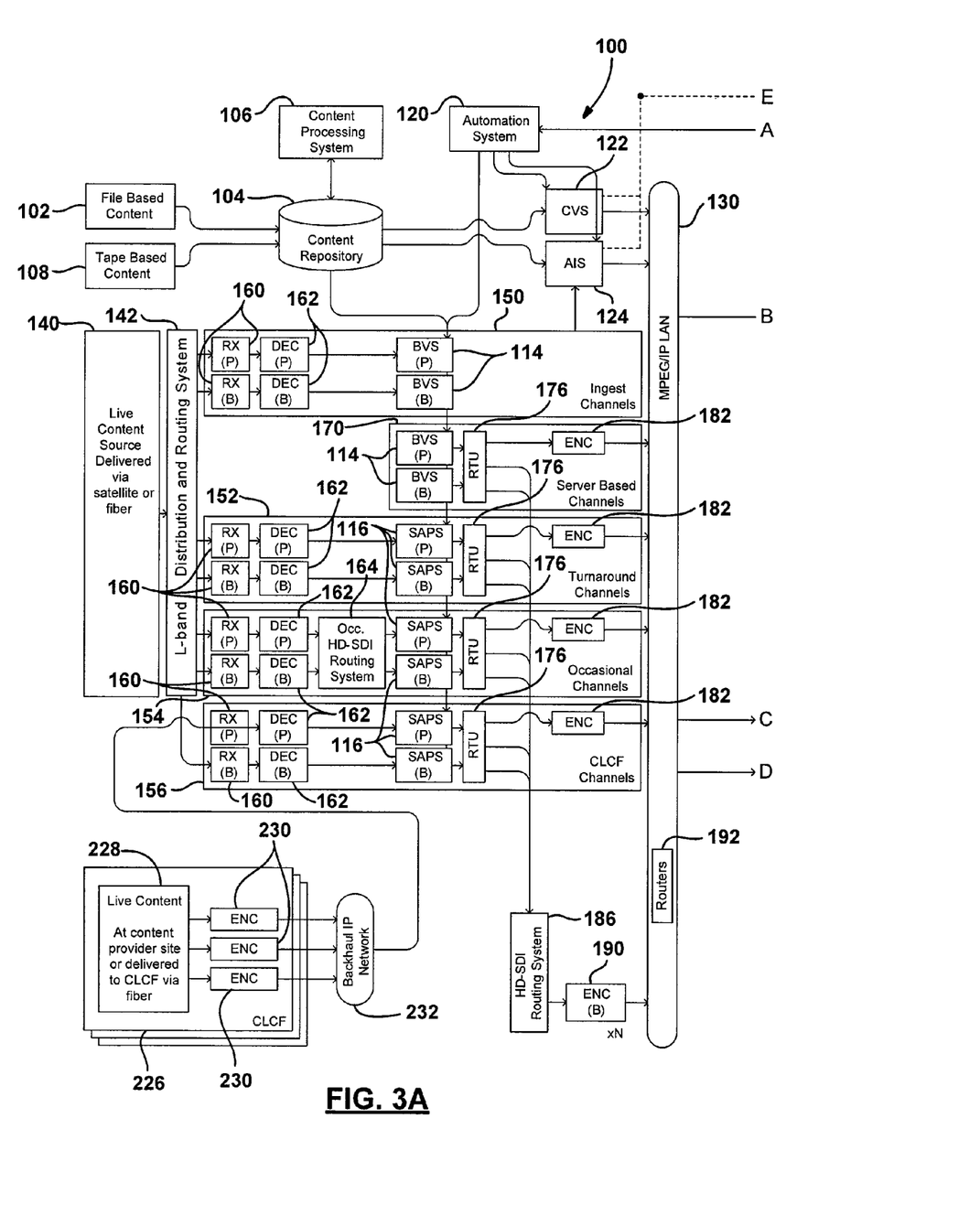
FIGS. 3A and 3B are a block schematic view of the system illustrated in FIGS. 1 and 2.
Figure 3B:
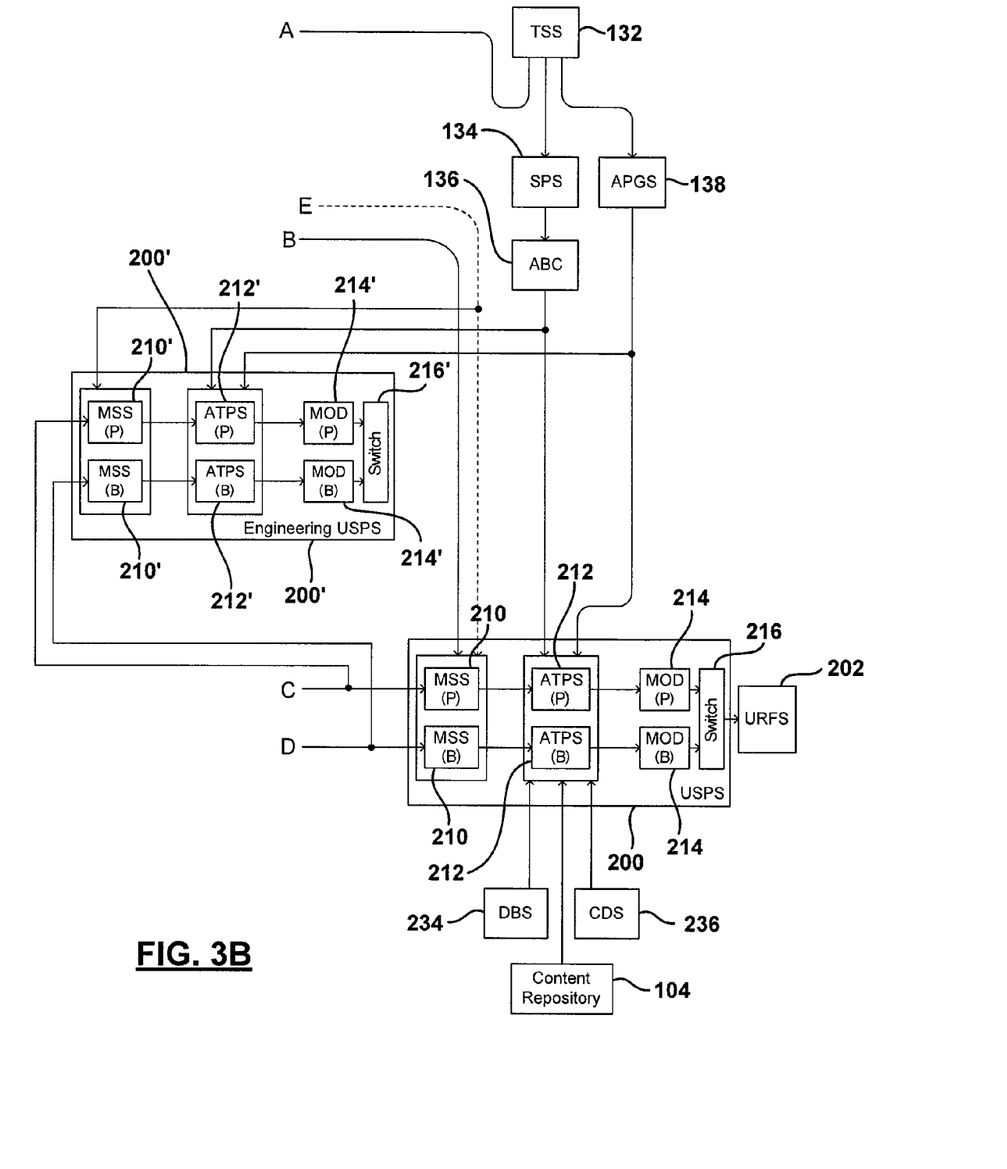

Referring now to FIGS. 3A and 3B, a ground segment system 100 for processing content and forming an output signal is illustrated. One method for providing content is using file-based content 102. The file-based content 102 may be in various standard formats such as CableLabs® content, digital video disks or the like. The file-based content 102 is provided to a content repository 104 that stores the various file-based content. If needed, a content processing system 106 processes the content and converts the format of the file-based content. The content processing system 106 may convert the video compression format, the resolution, the audio compression format and audio bit rates to match the target broadcast path. The content from the content repository 104 may be provided to various systems as will be described below. The content repository 104 may also receive tape-based content 108. The tape-based content 108 may be processed in the content processing system 106 into various formats including a first format such as high-definition, serial digital interface (HD-SDI) format. The content repository 104 may provide content to baseband video servers 114. The (P) and the (B) in the Fig. denote a primary and secondary or back-up baseband video server. The content repository 104 may also provide signals to various service access processing systems 116. As illustrated, several service access processing systems (SAPS) are illustrated. Both primary and back-up service access processing systems 116 may be provided in the various chains.

An automation system 120 may control the insertion of various advertising into file-based and live streams. The SAPS 116 may function as an advertising insertion module. The SAPS 116 may also include a digital video effects insertion module described below. The function of the automation system 120 will be further described below.

Content repository 104 may also be coupled to a compressed video server (CVS) 122 and an advertising-insertion server (AIS) 124. The compressed video server 122 uses content that is retrieved from the content repository 104. The content repository 104 stores the content well in advance of use by the compressed video server 122. Likewise, advertising may be also drawn from the content repository 104. Both the content video server 122 and ad-insertion server 124 provide content in a compressed manner. This is in contrast to the baseband video server 114 that is provided content in a baseband. The output of the content video server may be in an IP transport stream. The content output of the compressed video server 122 and the ad-insertion server 124 may be provided to a local area network 130.

Figure 5:
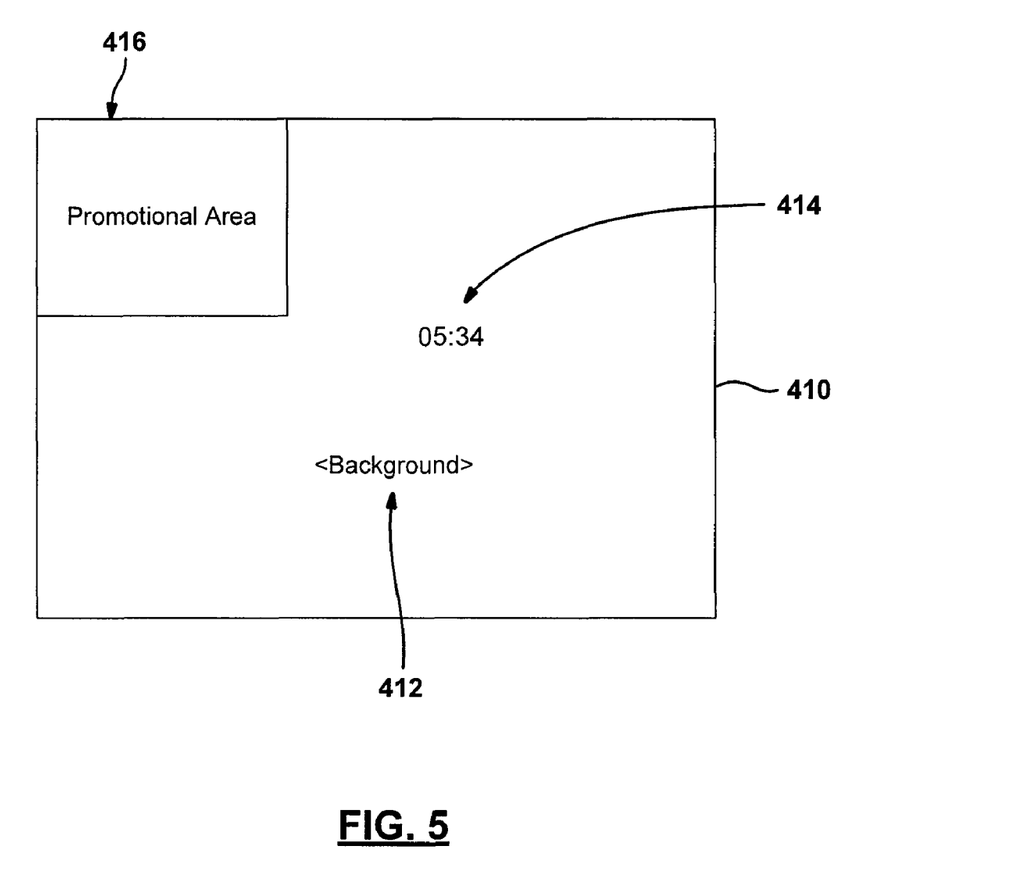
FIG. 5 is a screen display of a countdown clock screen display.

A traffic scheduling system (TSS) 132 schedules the content throughout the ground segment 100. The traffic scheduling system 132 generates broadcast schedules utilized by the baseband video servers 114, the service access processing system 116, the automation system 120, the compressed video server 122 and the ad-insertion server 124. The traffic and scheduling system 132 provides program-associated data (PAD) to a scheduled PAD server (SPS) 134. The SPS 134 delivers the program-associated data to an advanced broadcast controller (ABC) 136. As will be described below, an advanced broadcast management system (ABMS) 500 illustrated in FIG. 5 is used to monitor and control the content.

The traffic and scheduling system 132 may also be in communication with an advanced program guide system 138.

A live content source 40 delivered by way of a satellite optical fiber or copper wires couple live content to an L-band distribution and routing system 142. Of course, those skilled in the art will recognize various other frequencies may be used for the L-band. The output of the routing system 42 may be provided to ingest channels 150, turnaround channels 152, occasional channels 154, and continental United States local collection facility channels 156. Each of the various channels 150-156 may represent a number of channels. Each of the channels has primary and secondary or back-up circuitry for processing the data stream.

The output of the L-band distribution and routing system 142 provide signals to receivers 160. As mentioned above, the paths may be in primary or secondary paths. The receivers 160 receive the feed signal from the L-band distribution and routing system 142 and demodulate the feed signal. The receiver may also provide decryption. The feed signal may be in an ATSC-compliant transport stream from terrestrial fiber or satellite sources. The feed signal may also be a DVD-compliant transport stream delivered via satellite or fiber. The signal may also include a digicipher-compliant transport stream, a JPEG 2000 transport stream or various proprietary formats from various content providers. The output of the receiver may be provided via an ASI or MPEG IP interface.

Should the content from the content provider be provided in a format that can be immediately used by the system, the receiver may be replaced with a pass-through connector such as a barrel connector.

The receive signal from the receiver 160 is provided to decoders 162. The decoders 162 decode the receive signal to provide decoded signals. The receive signal may still be compressed and, thus, the decoder may be used for decoding the live compressed video and audio content. The receive signal may be an ATSC-compliant transport stream, a DVD-compliant transport stream, a digicipher-compliant transport stream, a JPEG 2000 transport stream or various proprietary formats that may be delivered via ASI or MPEG/IP. The output of the decoder is a baseband signal that may be in a variety of formats such as a high definition serial digital interface (HD-SDI) format. The decoders 162 may also include a general purpose interface used to convey add trigger events via contact closures. The input may be delivered directly from an upstream receiver, a conversion box that converts dual-tone multi-frequency tones from the upstream receiver into the general purpose interface. The audio format may carry various types of audio streams including Dolby digital, Dolby E or PCM audio. More than one type of audio stream may be included for a signal. The house signal may also include Society of Cable Telecommunication Engineers (SCTE) standard 104 and 35 messages. The house signal may also include closed captioning and vertical interval time code (VITC). It is possible that the decoder may not be required if the content provided from the live content sources is in the proper format. Therefore, the decoder is an optional piece of equipment.

For the occasional channels 154, the output of the decoders 162 may be provided to an occasional HD-SDI routing system 164. Of course, the output of the receiver 152 may be routed rather than the output of the decoder 152. An occasional channel is a live turnaround channel that only exists long enough to carry one or more events, typically sporting events such as those in the NFL or NBA. The type of receiver formatting or authorizations may vary depending on the type of event. Only a small number of receivers are used for these types of events. The routing system 164 allows a proper allocation of downstream equipment in proportion to the number of active broadcast channels rather than the number of content providers.

The output of the decoders 162 in the ingest channels 150, the turnaround channels 152, and the CONUS local collection facility channels 156 are each provided to the SAPS 116. The SAPS 116 provides baseband processing which may include conversion to a house format and ad-insertion. The SAPS 116 receives a single HD-SDI signal from each decoder 162. It is possible that the decoder and the SAPS may be combined in one unit. The service access processing system SAPS 116 may extract and reinsert various audio streams, such as PCM, Dolby digital, or Dolby E audio. The SAPS 116 may also transcode the signals in the case where a different coding scheme is required. Various operational modes may also be incorporated into the SAPS 116 including frame synchronization, error concealment, and the use of variable incoming bit rates. The SAPS 116 may also support real time changes in the video format. The video format may, for example, be 1080p, 1080i, 720p, and 480p.

Server-based channels 170 may also be included in the system. Server-based channels 170 include a baseband video server 114 that receives content from the content repository 104.

The primary and back-up baseband video servers 114 of the server-based channels 170 may be coupled to a receiver transfer unit (RTU) 176 which acts as a switch-to-switch between primary and back-up signals. The primary and back-up service access processing system of the turnaround channels 152, the occasional channels 154, and the remote collection facility channels 156 may all be coupled to a receiver transfer unit 176. The receiver transfer unit 176 performs various functions including redundancy switching or selection for choosing between the primary and the back-up outputs of the baseband video server 114 or the service access processing system 116 and providing the chosen signal to an encoder 182. The receiver transfer units 176 may also route the signals for monitoring and redundancy to an HD-SDI monitoring system 186. The receiver transfer units 176 may provide an automatic redundancy mode in which the unit fails to a back-up input upon loss of a primary input signal. The RTU 176 may also be implemented so that a switch back from the back-up to the primary unit may not be automatically performed without manual intervention. The receiver transfer unit 176 may be a switch that is controlled by the advanced broadcast management system 300 (of FIG. 5) to generate an output signal. In the case of a failure of one of the encoders 182, a routing system 186 may be used to route the signal through a back-up encoder 190.

The HD-SDI routing system 186 may provide a plurality of back-up encoders for the various channels. A number of back-up encoders may be provided based on the number of primary encoders. In one example, three back-up encoders for every primary encoder were provided.

The encoders 182 and the encoders 190 encode the video audio closed-captioned data VITC and SCTE 35 data associated within a single chain. The output of the encoder is a single program transport stream that is provided by way of an MPEG-IP interface. The single program transport stream (SPTS) is coupled to a local area network 130. The local area network 130 may include a plurality of routers 192 that are used to route the single port transport streams to an uplink signal processing system (USPS) 200. Several uplink signal processing systems 200 may be provided. This may include a secondary or back-up USPS that will be referred to as an engineering USPS 200'. The single program transport stream includes identification of the signal so that it may be properly routed to the proper uplink signal processing system. The uplink signal processing system 200 generates an output to an uplink RF system (URFS) 202 that includes a power amplifier. The uplink signal processing system 200 may also provide redundant pairs to increase the reliability of the output signal.

The uplink signal processing system 200 may include a multiplexing splicing system (MSS) 210, an advance transport processing system (ATPS) 212, and a modulator 214. Pairs of multiplexing splicing systems 210, advance transport processing systems 212, and modulators 214 may be provided for redundancy. The multiplexing splicing system 210 multiplexes the single program transport stream from the local area network 130 into a multiplexed transport stream (MPTS). The MSS 210 may also act to insert advertising into the signal. Thus, the MSS 210 acts as a multiplexing module and as an ad insertion module. Various numbers of single-program transport streams may be multiplexed. In one constructed embodiment, eight single program transport streams were multiplexed at each MSS 210. The ads to be inserted at the MSS 210 may be formatted in a particular format such as MPEG 4 format and have various types of digital including Dolby digital audio streams. The MSS 210 may identify insertion points based on SCTE 35 in the incoming stream. The advance transport processing system 212 converts the DVB-compliant transport stream from the MSS 210 into an advanced transport stream such as the DIRECTV A3 transport stream. The ATPS 212 may support either ASI or MPEG output interface for the broadcast path. Thus, the ATPS 212 acts as an encryption module. The ATPS 212 may accept data from the advanced broadcast controller 136 and the advanced program guide system 138. The ATPS 212 may also be coupled to a data broadcast system 226. The data from the ABC 136, the APGS 138, and the DBS 226 are multiplexed into the output transport stream. Thus, the ATPS 212 acts as a data encryption module. As will be described below, the ATPS may also be coupled to the advanced broadcast management system described below in FIG. 4. Error reporting to the advanced broadcast management system (300 in FIG. 5) may include transport level errors, video outages, audio outages, loss of connection from a redundancy controller or a data source, or a compression system controller.

The modulators 214 modulate the transport stream from the ATPS 212 and generate an RF signal at a frequency such as an L-band frequency.

An RF switch 216 is coupled to the primary modulator and back-up modulator 214. The RF switch provides one output signal to the uplink RF system 202.

The ATPS 212 may also receive information or data from a DBS 234. The DBS 234 provides various types of data to be inserted into the broadcast. The data information is provided to the ATPS 212 to be inserted into the program stream. A content distribution system 236 may also be used to couple information to the ATPS. The content distribution system may provide various information such as scheduling information, or the like. The content repository 104 may also be directly coupled to the ATPS for providing various types of information or data.

Referring back to the front end of the ground segment 100, a CONUS local collection facility (CLCF) 226 may be used to collect live content represented by box 228 at a content-provider site or delivered to the CLCF 226 by way of a fiber. A plurality of encoders 230 may be used to encode the signals in a useable format by the system. The encoder signals may be provided to a backhaul Internet protocol network 232 and provided to a decoder 162 within the CLCF channels 156 or to a receiver 160 in the CLCF. As mentioned above, if the content is formatted in a usable format, the receiver 160 may not be required. Should the receiver function be required, a receiver may be used in the system.

Several uplink signal processing systems 200 may be provided for any one system. Each of the uplink signal processing systems may correspond to a single transponder on a single satellite. Thus, the combined single program transport streams received at the multiplex splicing system 210 are combined to fit on a single transponder.

A back-up or engineering uplink system processing system 200' may also be provided. The engineering uplink signal processing system 200' may have the same components as the USPS 200. The engineering USPS 200' may be used as a substitute for a particular transponder should one of the primary USPSs fail for any reason.

The ABMS system 324 may be used to monitor various portions of the system including the each of the components of the USPS 200, the RTU and BVS or automation system. Monitor may be generated from the various component and control signals generated to the components. As mentioned above, the USPS 200 may include a multiplexer. The multiplexer may be used for inserting a slide due to technical difficulty at a component such as the encoders 330. A slide insertion signal may be generated in response. This will also be described further below.

The ABMS system 324 may also be in communication with the RTU switch 176. The switch 176 may be monitored to determine whether the primary or back-up automation system is broadcasting.

Figure 4:
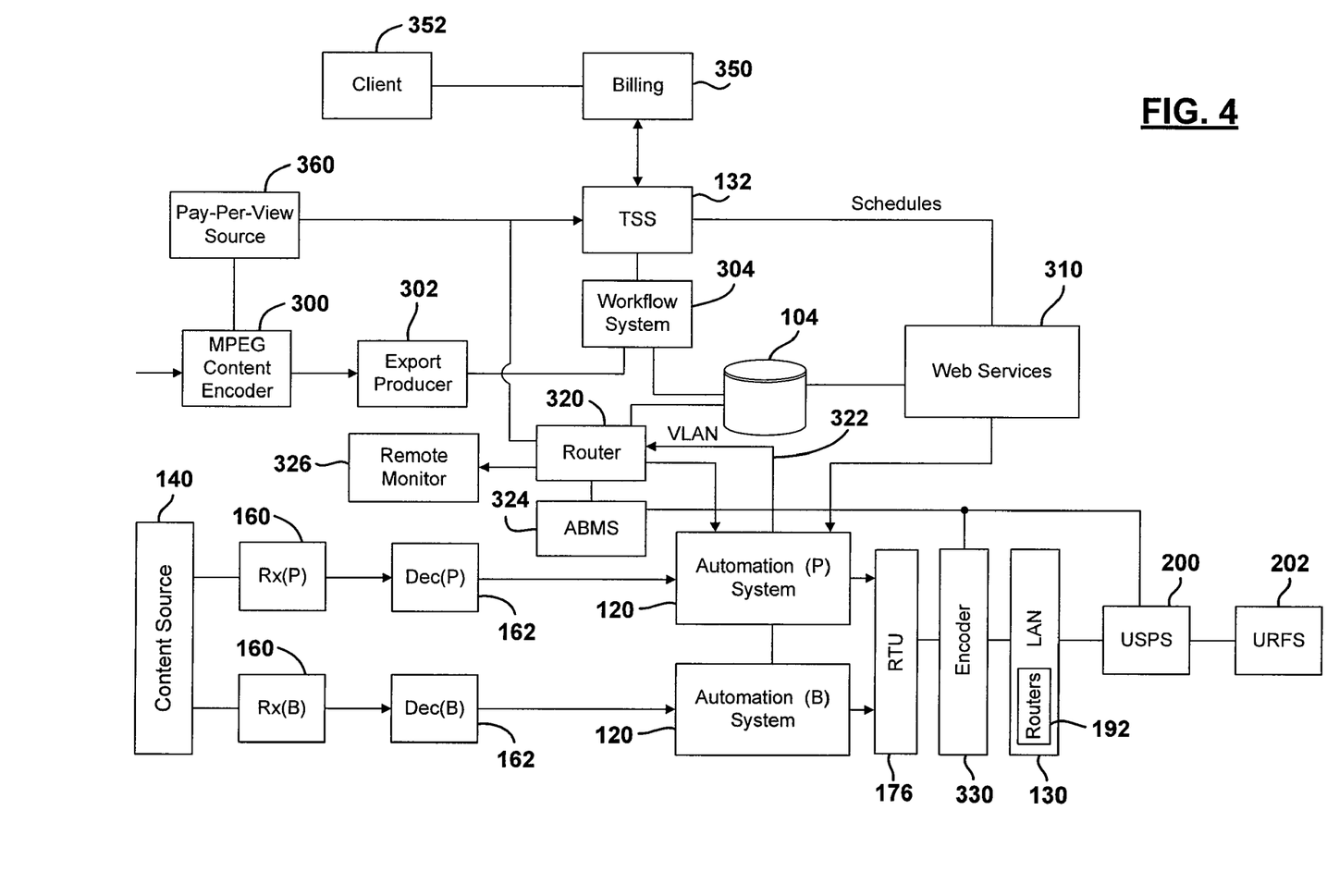
FIG. 4 is a block diagrammatic view of a second embodiment of a system illustrated in FIG. 3.

Referring now to FIG. 4, a block diagrammatic view of a triggering insertion system formed according to the present disclosure is set forth. In this embodiment, elements of FIGS. 3A and 3B are labeled the same. Also, the automation system 120 in FIG. 3 has been incorporated in the place of the baseband video server (BVS) 114 illustrated in FIG. 3A since the automation system and the BVS may function together. The system illustrated in FIG. 4 includes further details for inserting insertion material and monitoring insertion material such as commercials, promotional materials and slides. The system set forth in FIG. 4 is particularly suitable for insertion of material into live channel streams.

An encoder 300 such as an MPEG 2 encoder may be used to receive material from outside sources into an export producer 302. The export producer 302 communicates insert content such as commercial spots, slides or promotional material to a workflow system 304. The workflow system 304 communicates the content to the content repository 104 where it is stored therein. The workflow system 304 may generate an insert material identifier such as an ISCI (Industry Standard Commercial Identifier) for commercial or promotional spots. A typical ISCI identifier format includes an alphabetic identifier identifying the source and a numeric identifier identifying the spot number. The workflow system 304 may also receive content such as pay-per-view content which is assigned a material ID at the workflow system 304. The material ID and the ISCI may be assigned by the traffic scheduling system 132.

The traffic scheduling system 132 may also set schedules for insertion of various insert materials into broadcast programming. Programming or break windows may be assigned for the insertion of the insertion material. The break windows may also be manually inserted by a system operator. Thus, the schedules may include the time window and the insert material identification.

The schedules may be communicated through a web services server 310 to the automation system 120. Both the back-up and primary automation system 120 may receive the web services' command or schedule. The web services server 310 may be used to assign the automation servers to a particular channel. For example, a control channel identifier CCID may be assigned to a particular automation system 120 that has an automation system address such as "1000." Both an "a" and "b" address may be used for the primary and back-up automation systems 120.

A router 320 may be used to route various material through the system. The router 320 may be used to communicate content and insert material to the automation system 120. The automation system 120 may communicate video information through a video LAN connection (VLAN) 322 to the router 320 where it may be monitored through an advanced baseband monitoring system (ABMS) 324. The ABMS system 324 may include displays for displaying various signals and controlling various signals.

The automation system 120 may receive triggers such as a general purpose interface (GPI) trigger, a Society of Cable Telecommunications Engineers (SCTE) 104 trigger or a digital program insertion interface (DPI) trigger. Such triggers may be included in the vertical ancillary portion (VANC) data portion of the received signal. The trigger data may include metadata regarding the timing and length of the break. A pre-roll time may be included in the trigger metadata. The pre-roll time is a time corresponding to the time until a break occurs. By communicating the pre-roll time to the automation system the insert material may be retrieved and used.

A remote monitor 326 may also be coupled to the router 320. The remote monitor 326 may be used to receive monitoring signals that may be monitored from a remote site. For example, the remote monitor 326 may be located in the home of a supervisor or the like. The remote monitor, as will be further described below, may be accessed through the Internet upon a proper authentication.

The above-specified system may be used for both pay-per-view and live content signal streams. In a live content signal stream, content is received through the content sources 140 and received at receiver 160. The received signals are decoded at the decoders 162 which are then provided to the automation system 120. For a pay-per-view content stream, the content is retrieved from the content repository 104 and provided to the automation system 120 without the need for receiving and decoding. As will be described below, the automation system 120 may then be used to insert insertion material into a channel signal stream. As will be described below, the monitoring system may be used to monitor the signals. The automation system 120 may be used to monitor the channel signals and the channel signals with the insertion information or insertion insert material.

The automation system 120 provides these signals through the remote transfer units 176, through the encoders 330, through the LAN 192 through the uplink signal processing system 200 and through the uplink RF system 202 which generates an uplink signal. Components 176, 192, 200 and 202 were described thoroughly above.

The system may also include a billing module 350. The billing module 350 is shown in communication with the traffic scheduling system 132. However, the billing module 350 may also be in direct communication with the workflow system 304, the router 320 or the automation system 120. The billing system is used to bill insert material providers such as clients 352 for inserting their insert material into the content signal.

As will be described below, the insert material provider, such as advertisers, pay to have insert material inserted into the content stream. The clients may receive deviation messages if an insert was unplayed. In response to the deviation message, an authorization reschedule signal may be generated so the insert is rescheduled.

Referring now to FIG. 5, a screen display 410 illustrating a countdown clock assembly is illustrated. The countdown clock assembly includes a background 412 having a countdown timer 414 thereon. The background 412 and the countdown timer 414 may be included in a single file. The background 412 may be one of various types of backgrounds suitable for the particular channel. The background may include I-frames, JPEGs or other graphics. The background for a particular countdown clock display may include several backgrounds that are used at different times. The countdown clock assembly 410 may also include a promotional area 416. The promotional area 416 may include the entire screen with the countdown clock 414 displayed on a portion thereof. If the promotional area 416 uses the entire screen, then the background may be covered. Thus, the promotional area 416 may be of various sizes.

In addition, other graphics or content may be also included in the assembly 410 such as instructions or other promotional material.

The countdown clock assembly 410 may be used between various content on various types of channel signals including on a pay-per-view channel between various pay-per-view content programs.

Figure 6:
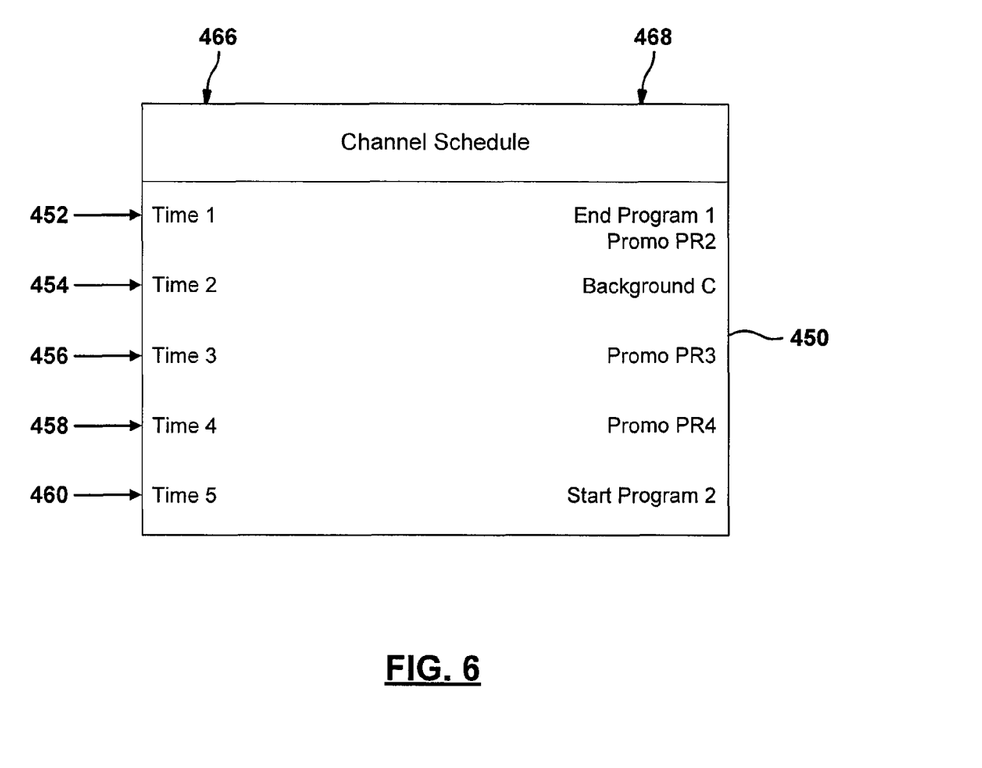
FIG. 6 is a tabular view of a countdown channel schedule.

Referring now to FIG. 6, a simplified channel schedule 450 is illustrated. The channel schedule 450 includes rows 452, 454, 456, 458 and 460 that correspond to times one through five. As is illustrated, the End Program 1 portion ends at Time 1. A countdown clock display assembly from the promotion PR2 and background C is provided at Time 2. At Time 3 in row 456, promo PR3 is run. This may be run in the promotional area 416 illustrated in FIG. 5 above. At Time 4 in row 458, promo PR4 is run. In step 460, start Program 2 may be performed. The times are in column 456 and the commands are in column 468. Of course, this is a simplified view of a channel schedule and thus more information may be provided in an actual embodiment of a system including various titles, lengths and other information.

Figure 7:
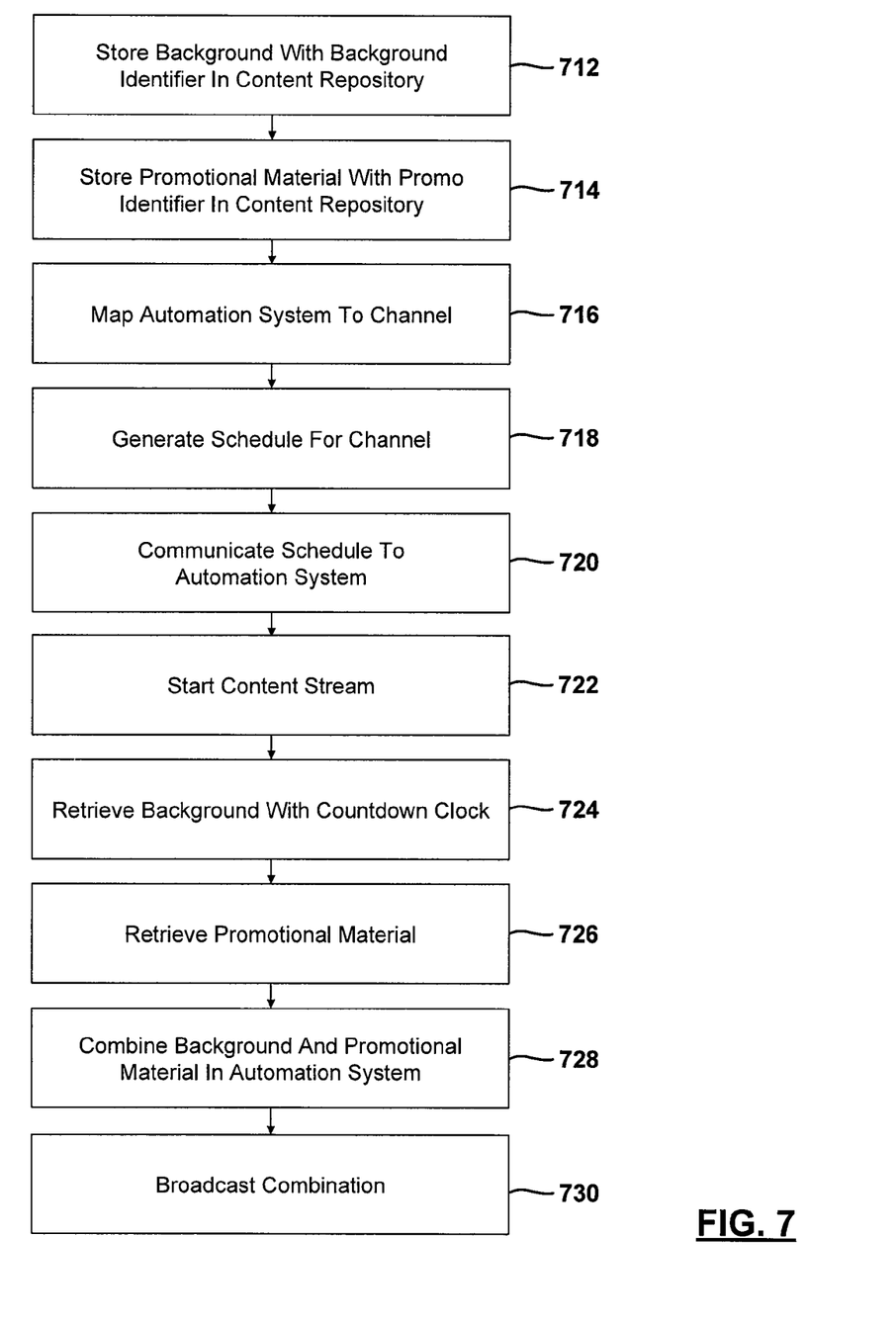
FIG. 7 is a flow chart of a method of forming a countdown clock.

Referring now to FIG. 7, a method for generating and controlling a countdown clock assembly display is illustrated. As mentioned above, the countdown clock assembly display may be used for various types of channels. A countdown clock assembly display is particularly suitable for pay-per-view channels.

In step 712, a background with a background identifier is stored in the content repository. These may be received in various manners including through the MPEG content encoder 300. The background may be made in-house or received from various sources.

In step 714, promotional material with promotional identifiers is stored in the content repository 714. The promotional material may be received with various content including through the MPEG content encoder 300. Promotional material such as commercials may also be formed in-house and stored within the content repository.

In step 716, the automation system is mapped to a particular channel. By mapping the automation system, the channel is assigned to the particular automation system. Should a reassignment be required, merely the mapping would be reassigned.

In step 718, a schedule for a channel, such as that illustrated above in FIG. 6, may be performed. The channel schedule may include the times for various types of content such as pay-per-view content and for the playout of a countdown clock assembly display. The schedule may include various identifiers associated with the portions of the countdown clock including the background identifier and the promotional material identifier or identifiers for a particular countdown clock assembly. It should be noted that, if the time period associated with the countdown clock portion of the countdown clock assembly is long, several promotional materials may be used. Several different backgrounds may also be used.

In step 720, the schedule that may be formed in the traffic and scheduling system may be communicated to the automation system. In step 722, the content stream may be started. The channel signal may be started using the pay-per-view content source 360 illustrated in FIG. 4. The pay-per-view content source, as mentioned above, may be a videotape recorder, digital video disc, or various types of sources. A live feed or source may also be used.

According to the schedule, when the countdown clock assembly is desired, step 724 retrieves the background from the content repository with the countdown clock. In step 726, the promotional material is retrieved. Both the background and the promotional material are retrieved according to their associated identifiers. In step 728, the background and promotional material are combined to form the countdown clock assembly in step 728. The countdown clock assembly, as mentioned above, may have various promotional materials associated therewith. Commercials, trailers and other types of promotional material may be displayed. The countdown clock may extend have various durations depending on the time space between two programs. The countdown clock assembly is most likely needed for time periods of less than one-half of an hour.

It should be noted that steps 724 and 726 may be performed earlier than the required time for forming the countdown clock. Both the background information and the promotional material information may be stored within the automation system a predetermined time before required so it is ready and at-hand for the scheduled time. After the assembly is formed at the automation system in step 728, the combination forming the countdown clock assembly may be broadcast. That is, the channel signal, including the countdown clock assembly, may be communicated through the remote transfer unit 176, the encoder 730 and the uplink signal processing system 200. The uplink signal processing system 200 may be used to generate an uplink signal which is communicated to the uplink RF system 202.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating a schedule having a countdown time for a countdown clock assembly in a scheduling system;
communicating the schedule to an automation system;
storing promotional content in a content repository;
storing a clock background in the content repository;
retrieving the promotional content and the clock background from the content repository at the automation system;
forming the countdown clock assembly from the promotional content, the countdown time and the clock background in the automation system; and
inserting the countdown clock assembly into a channel signal at the automation system.

2. A method as recited in claim 1 wherein the channel signal comprises a pay-per view channel signal.

3. A method as recited in claim 1 further comprising generating a first content signal from a content source and routing the first content signal to the automation system, broadcasting the first content signal and thereafter performing the step of inserting the countdown clock.

4. A method as recited in claim 1 further comprising storing the promotional content and the clock background in the automation system.

5. A method as recited in claim 1 wherein retrieving the promotional content and clock background is performed prior to forming a countdown clock assembly.

6. A method as recited in claim 1 wherein retrieving promotional content and clock background is performed a predetermined time prior to forming a countdown clock assembly.

7. A method as recited in claim 1 wherein the automation system comprises a primary automation system and a backup automation system.

8. A method as recited in claim 1 further comprising forming an uplink signal from the channel signal and uplinking the uplink signal to a satellite.

9. A method as recited in claim 1 wherein the promotional content comprises a plurality of promotional content.

10. A method as recited in claim 1 wherein the channel signal includes a first content signal, followed by the countdown clock assembly, followed by a second content signal.

11. A method comprising:
generating a schedule having a countdown clock time, a promotional content identification and a background identification for a countdown clock assembly in a scheduling system;
communicating the schedule to an automation system;
storing promotional content in a content repository;
storing a clock background in the content repository;
retrieving the promotional material and the clock background from the content repository based on the promotional content identification and the background identification from the schedule at the automation system;
storing the promotional material and the clock background in the automation system prior to the countdown clock time;
forming the countdown clock assembly from the promotional material, the countdown time and the clock background in the automation system; and generating a channel signal from the countdown clock assembly at the automation system.

12. A method as recited in claim 11 wherein the channel signal comprises a pay-per view channel signal.

13. A method as recited in claim 11 further comprising generating a first content signal from a content source and routing the first content signal to the automation system, broadcasting the first content signal and thereafter performing the step of inserting the countdown clock.

14. A method as recited in claim 11 wherein retrieving the promotional content and clock background is performed prior to forming a countdown clock assembly.

15. A method as recited in claim 11 wherein retrieving promotional content and clock background is performed a predetermined time prior to forming a countdown clock assembly.

16. A method as recited in claim 11 wherein the automation system comprises a primary automation system and a backup automation system.

17. A method as recited in claim 11 further comprising forming an uplink signal from the channel signal and uplinking the uplink signal to a satellite.

18. A method as recited in claim 11 wherein the promotional content comprises a plurality of promotional content.

19. A method as recited in claim 11 wherein the channel signal includes a first content signal, followed by the countdown clock assembly, followed by a second content signal.

20. A system comprising:
an automation system;
a scheduling system generating a schedule having a countdown time for a countdown clock assembly and communicating the schedule to an automation system;
a content repository storing promotional content and a clock background in the content repository; and
said automation system retrieving the promotional content and the clock background from the content repository, storing the promotional content and the clock background, forming the countdown clock assembly from the promotional content, the countdown time and the clock background and inserting the countdown clock assembly into a channel signal.

21. A system as recited in claim 20 wherein the channel signal includes a first content signal, followed by the countdown clock assembly, followed by a second content signal.

22. A system as recited in claim 20 wherein the channel signal comprises a pay-per view channel signal.

23. A system as recited in claim 20 wherein the automation system retrieves the promotion content and clock background prior to forming a countdown clock assembly.

24. A system as recited in claim 20 wherein the automation system comprises a primary automation system and a backup automation system.

25. A system as recited in claim 20 further comprising an uplink system forming an uplink signal from the channel signal and uplinking the uplink signal to a satellite.

* * * * *